United States Patent
Matthews et al.

(10) Patent No.: US 6,459,731 B1
(45) Date of Patent: *Oct. 1, 2002

(54) TECHNIQUE FOR VIDEO COMMUNICATIONS USING A CODING-MATCHED FILTER ARRANGEMENT

(75) Inventors: Kim Nigel Matthews; Elissa P. Matthews, both of Watchung, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,949

(22) Filed: Aug. 28, 1998

(51) Int. Cl.$^7$ ................................................. H04B 1/66
(52) U.S. Cl. .................................. 375/240.03; 382/251
(58) Field of Search ........................... 348/425.2, 425.3, 348/437.1, 405.1, 404.1, 420.1, 426.1, 607, 618; 375/240.1, 240.25, 240.29, 240.04, 240.03, 240.16, 240.2; 382/251, 252, 253, 268, 275, 239, 250

(56) References Cited

U.S. PATENT DOCUMENTS

| | | | | |
|---|---|---|---|---|
| 4,379,949 A | * | 4/1983 | Chen et al. .................. | 375/240 |
| 5,086,488 A | * | 2/1992 | Kato et al. ................... | 382/239 |
| 5,241,387 A | * | 8/1993 | Fujikawa et al. ............ | 348/607 |
| 5,333,212 A | | 7/1994 | Ligtenberg | |
| 5,369,439 A | * | 11/1994 | Matsuda et al. .......... | 375/240.2 |
| 5,374,958 A | * | 12/1994 | Yanagihara ............ | 375/240.04 |
| 5,479,211 A | * | 12/1995 | Fukuda ................... | 375/240.03 |
| 5,534,925 A | | 7/1996 | Zhong | |
| 5,724,097 A | * | 3/1998 | Hibi et al. ............. | 375/240.04 |
| 5,754,699 A | * | 5/1998 | Sugahara .................... | 382/233 |
| 6,246,438 B1 | * | 6/2001 | Nishikawa et al. .... | 375/240.12 |

FOREIGN PATENT DOCUMENTS

EP   0 848 557 A2   6/1998

OTHER PUBLICATIONS

A. Jacquin, "Content–Adaptive Postfiltering for Very Low Bit Rate Video," *IEEE Computer Society Press,* Proceedings Data Compression Conference, Mar. 25–27, 1997, pp. 111–121.
T. Kasezawa, "Blocking Artifacts Reduction Using Discrete Consine Transform," *IEEE Transactions on Consumer Electronics,* vol. 43, No. 1, Feb. 1997, pp. 48–54.
S. Choy et al., "Reduction of Block–Transform Image Coding Artifacts by Using Local Statistics of Transform Coefficients," *IEEE Signal Processing Letters,* vol. 4, No. 1, Jan. 1997, pp. 5–7.
T. Liu et al., "Adaptive Post–Processing Algorithms for Low Bit Rate Video Signals," *IEEE Transactions on Image Processing,* vol. 4, No. 7, Jul. 1995, pp. 1032–1035.

* cited by examiner

*Primary Examiner*—Chris Kelley
*Assistant Examiner*—Gims Philippe
(74) *Attorney, Agent, or Firm*—Ryan, Mason & Lewis, LLP

(57) ABSTRACT

In a system for communicating an image, an image compression scheme is employed to encode the image to reduce the required bandwidth for transmitting same. For example, this compression scheme includes performing, on the image, a discrete cosine transform (DCT), followed by quantization. To reduce the effects of coding artifacts occasioned by the compression scheme, in accordance with the invention, a filter arrangement which is matched to the coding of the image may be utilized to process a received image. The filter arrangement is designed to truncate each non-zero frequency component in the received image whose amplitude is lower than a certain threshold, which is a function of the quantization step size used.

38 Claims, 3 Drawing Sheets

TECHNIQUE FOR VIDEO COMMUNICATIONS USING A CODING-MATCHED FILTER ARRANGEMENT

FIELD OF THE INVENTION

The invention relates to communications systems and methods, and more particularly to a system and method for video communications which implements an image compression scheme.

BACKGROUND OF THE INVENTION

In video communications, images are coded in accordance with an image compression scheme to reduce the required bandwidth for transmitting the images. In accordance with such well known image compression standards as the MPEG, MPEG-2, motion-JPEG and JPEG standards, an image coding process typically includes performing a block based frequency transform, e.g., discrete cosine transform (DCT), on an image to be transmitted. The resulting DCT coefficients are quantized or mapped to different quantization steps to render an approximate representation thereof. If the available transmission bandwidth is relatively small, with respect to the complexity of the image to be transmitted, the size of the quantization steps needs to be relatively large. In that case, the resulting coarse quantization of the DCT coefficients introduces coding artifacts into the transmitted image, which include, e.g., speckle-like distortions near edges of objects appearing in a recovered image.

Attempts have been made to reduce effects of the coding artifacts by postprocessing the recovered image. Since the artifacts typically comprise high frequency components, such attempts invariably involve use of a postprocessor including a low-pass filter to filter out those components in the recovered image. However, the design of such a postprocessor is normally determined by experiment in an ad hoc manner. As a result, the quality of the postprocessed image is highly dependent upon how close the actual types of image transmitted and transmission rates used in the field are to those in the experiment. Consequently, use of the prior art postprocessor to improve the image quality is, at best, precarious as the performance achieved thereby may drastically vary from one set of field conditions to another.

Accordingly, there exists a need for a dependable technique for effectively reducing the effects of the coding artifacts in an image subject to an image coding process.

SUMMARY OF THE INVENTION

We have recognized that due to the implementation of the above image coding process, which involves quantization of block based frequency transform coefficients, e.g., DCT coefficients, concerning a transmitted image, the amplitude of each non-zero frequency component of the image, when received, cannot be smaller than a threshold value, which is a function of the quantization step size. That is, any non-zero frequency component having an amplitude smaller than the threshold value must be erroneously created, perhaps, by aliasing which is incurred due to the block structure of the transform coefficients traversing a channel, which is band limited.

Thus, in accordance with the invention, using a filter arrangement which is matched to the coding of the image involving the above quantization, the received image is transformed into a set of frequency components representative thereof. The quantization step size used in the quantization may vary from frequency component to frequency component. Each frequency component having a value below a threshold value corresponding thereto is removed from the set, where the threshold value is a function of the quantization step size associated with the frequency component. Advantageously, the resulting image formed by the remaining frequency components is superior in quality to the received image, with the effects of the coding artifacts in the received image substantially reduced. In addition, the effectiveness of the inventive technique is independent of the field conditions under which the image is communicated.

BRIEF DESCRIPTION OF THE DRAWING

In the drawing.

Throughout this disclosure, unless otherwise stated, like elements, components or sections in the figures are denoted by the same numeral.

DETAILED DESCRIPTION

Figure 1:
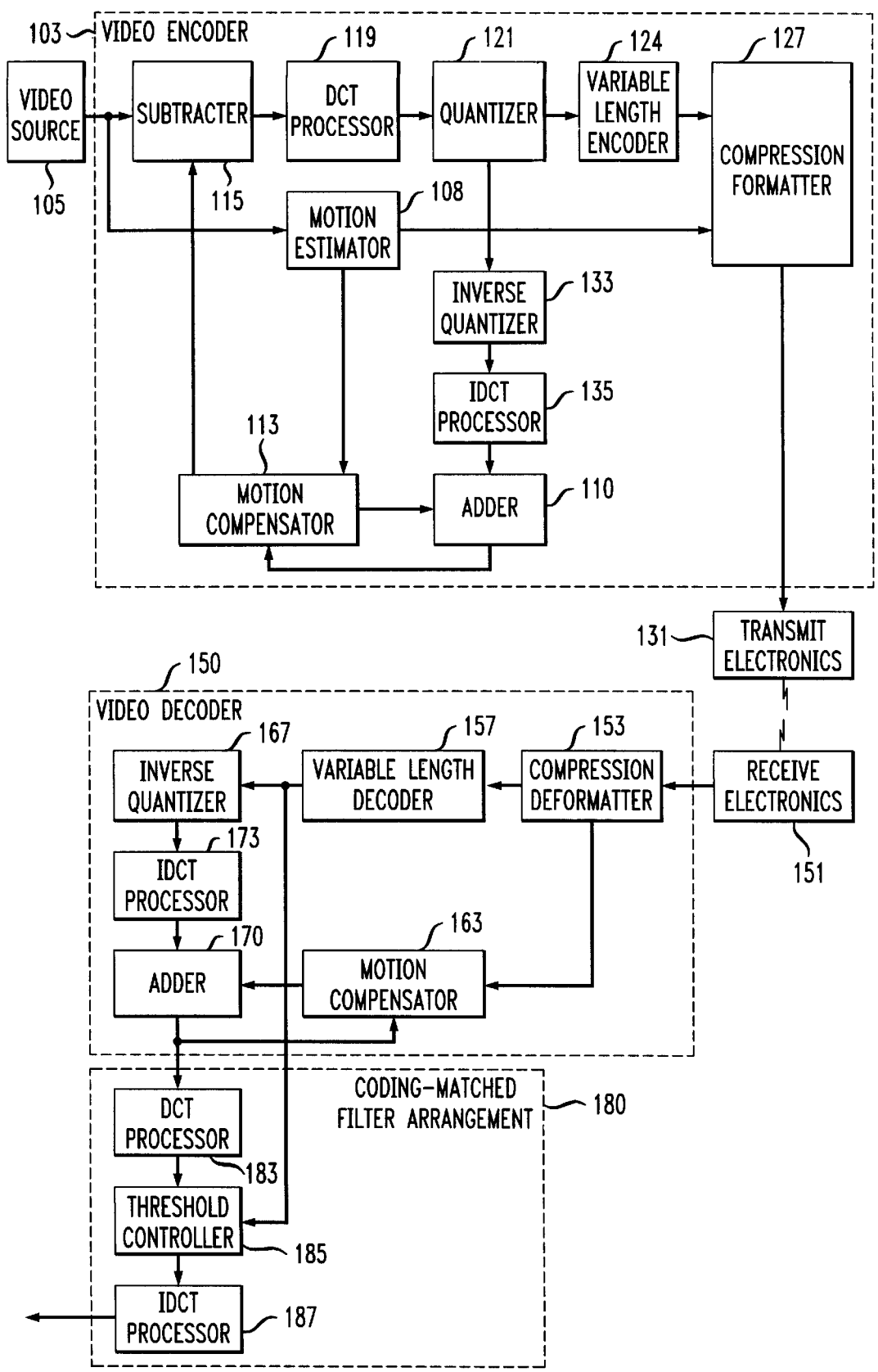
FIG. 1 is a block diagram of a communications system in accordance with the invention for communicating video images.

FIG. 1 illustrates communications system 100 embodying the principles of the invention for communicating video images. As shown in FIG. 1, system 100 comprises video source 105, video encoder 103, transmit electronics 131, receive electronics 151 and video decoder 150, all of conventional design, and coding-matched filter arrangement 180 in accordance with the invention.

Video source 105 in a conventional manner provides a bit stream representing images on a frame by frame basis. Each frame comprises L×M pixels, where L and M are selected integers greater than zero. For example, L=720 and M=480 in this instance. In response to such a bit stream, motion estimator 108, in a standard way, derives motion vectors indicating differences between the current image frame and the previous image frame from source 105. Based on such motion vector information, and the previously transmitted frame provided by adder 110 to be described, motion compensator 113 generates a predicted version of the current frame to be transmitted. This predicted version is provided to adder 110 and subtracter 115. The latter subtracts the predicted version of the current frame from the original version thereof from source 105, thereby forming a prediction error signal.

Discrete cosine transform (DCT) processor 119 performs a well known DCT, which is a block based frequency transform, on the prediction error signal from subtracter 115. The resulting DCT coefficients are arranged two-dimensionally in blocks. These DCT coefficients are quantized by quantizer 121, entropy encoded by variable length encoder 124, and formatted by compression formatter 127, in accordance with the well known MPEG image compression scheme described in: D. LeGall, "MPEG, a Video Compression for Multimedia Applications," *Transactions of ACM*, vol. 34, no. 4, Apr. 1991, pp. 46–58. To properly carry out such an image compression scheme, the aforementioned motion vector information is also provided by estimator 108 to compression formatter 127.

It should be noted at this point that although quantizer 121 is a linear quantizer, the quantization step size used therein varies with the position of each DCT coefficient in a block to control the resulting quantization error corrupting the frequency component represented thereby. Thus, the quantization step size here is generically represented by $Q_{ij}$, where i and j represent the row and column indexes of the DCT coefficient corresponding thereto in a block. It should also be noted that each $Q_{ij}$ varies from block to block and, thus, with time.

Specifically, the value of each DCT coefficient input to quantizer 121 is divided by the corresponding $Q_{ij}$, thereby obtaining a quotient qt which may be zero, and a remainder R which may also be zero. R is then compared with a "quantization threshold" which is $Q_{ij}/2$ in this example. If $R \geq Q_{ij}/2$, the signal assumes a level of $(qt+1)Q_{ij}$ for the coding purposes. Otherwise if $R<Q_{ij}/2$, the signal assumes a level of $(qt)Q_{ij}$.

The information concerning the quantization step size $Q_{ij}$ is also provided to variable length encoder 124 for transmission to video decoder 150. The output of compression formatter 127 may range from 1 Mb/s to 20 Mb/s, and is transmitted by transmit electronics through a communication channel.

The quantized DCT coefficients from quantizer 121 are fed back to inverse quantizer 133 to reconstruct the transmitted frame ultimately recovered in decoder 150. To that end, inverse quantizer 133 de-quantizes the quantized DCT coefficients, and thereby provides an approximate version of the original DCT coefficients. Based on such an approximate version, inverse DCT (IDCT) processor 135 recovers the prediction error signal. Adder 110 adds the recovered prediction error signal to the aforementioned predicted version of the transmitted frame from compensator 113, thereby reconstructing the transmitted frame, which is used by compensator 113 to predict the upcoming transmitted frame in a manner described before.

Receive electronics 151 receives, through the aforementioned communication channel, a signal representative of a transmitted image frame from transmit electronics 131. The received signal is processed by compression deformatter 153 in video decoder 150. Deformatter 153 performs the inverse function to compression formatter 127 described before. Among other things, deformatter 127 recovers the aforementioned motion vector information, which is fed to motion compensator 163. The remaining output is further processed by variable length decoder 157 which performs the inverse function to variable length encoder 124 described before. The output of decoder 157, which consists of the quantization step size information and quantized DCT coefficients, is provided to inverse quantizer 167. Where in some instances video encoder 103 may also provide field/frame information concerning the transmitted frame, the output of decoder 157 would also consist of such information. The quantization step size information, along with any field/frame information, is provided to coding-matched filter arrangement 180 described below.

It should be noted at this point that motion compensator 163, inverse quantizer 167, IDCT processor 173 and adder 170 in receiver 150 operate similarly to motion compensator 113, inverse quantizer 133, IDCT processor 135 and adder 110 in transmitter 103 to reconstruct the transmitted frame. Thus, based on the received motion vector information, like compensator 113, compensator 163 provides a predicted version of the transmitted frame to adder 170. Based on the quantized DCT coefficients and the received quantization step size, like inverse quantizer 133, inverse quantizer 167 provides a de-quantized, approximate version of the coefficients. Based on such a approximate version, like IDCT processor 135, IDCT processor 173 recovers the prediction error signal. Adder 170 adds the prediction error signal to the predicted version of the transmitted frame from compensator 163 to recover the transmitted frame. The recovered frame is fed back to compensator 163 to provide the predicted version of the upcoming transmitted frame.

However, the recovered image frame from adder 170 is corrupted by coding artifacts resulting from the MPEG coding scheme used in video encoder 103. These artifacts are attributable to the DCT, followed by the quantization, in such a scheme. Specifically, in transmitter 103, the prediction error signal from subtracter 115 is DCT transformed by processor 119 and then quantized by quantizer 121. If the values of the DCT coefficients from processor 119 are relatively small and the quantization step size is relatively large to effectively reduce the transmission rate, the coefficients may all be quantized to zero. This leads to transmission of a zero prediction error signal to receiver 150. As a result, the predicted version of the transmitted frame from motion compensator 163 in receiver 150 would not be corrected, thereby causing "prediction coding" artifacts. In addition, by virtue of use of the DCT which is a block based frequency transform, well known "block" artifacts also emerge in the recovered image frame.

In accordance with the invention, the recovered image frame from adder 170 is further processed by coding-matched filter arrangement 180 to reduce the effects of the aforementioned artifacts. Filter arrangement 180 is designed based on the coding scheme used, and in this instance is matched to that of the aforementioned MPEG scheme involving the DCT and quantization. Specifically, the recovered image frame from adder 170 is processed by DCT processor 183 in arrangement 180. Processor 183 in this instance performs a well known 8×8 DCT on the recovered image frame. However, it will be appreciated that a person skilled in the art may opt to perform other transforms, although less preferable, such as the Walsh-Hadamard transform or a one-dimensional transform, instead.

Figure 2:
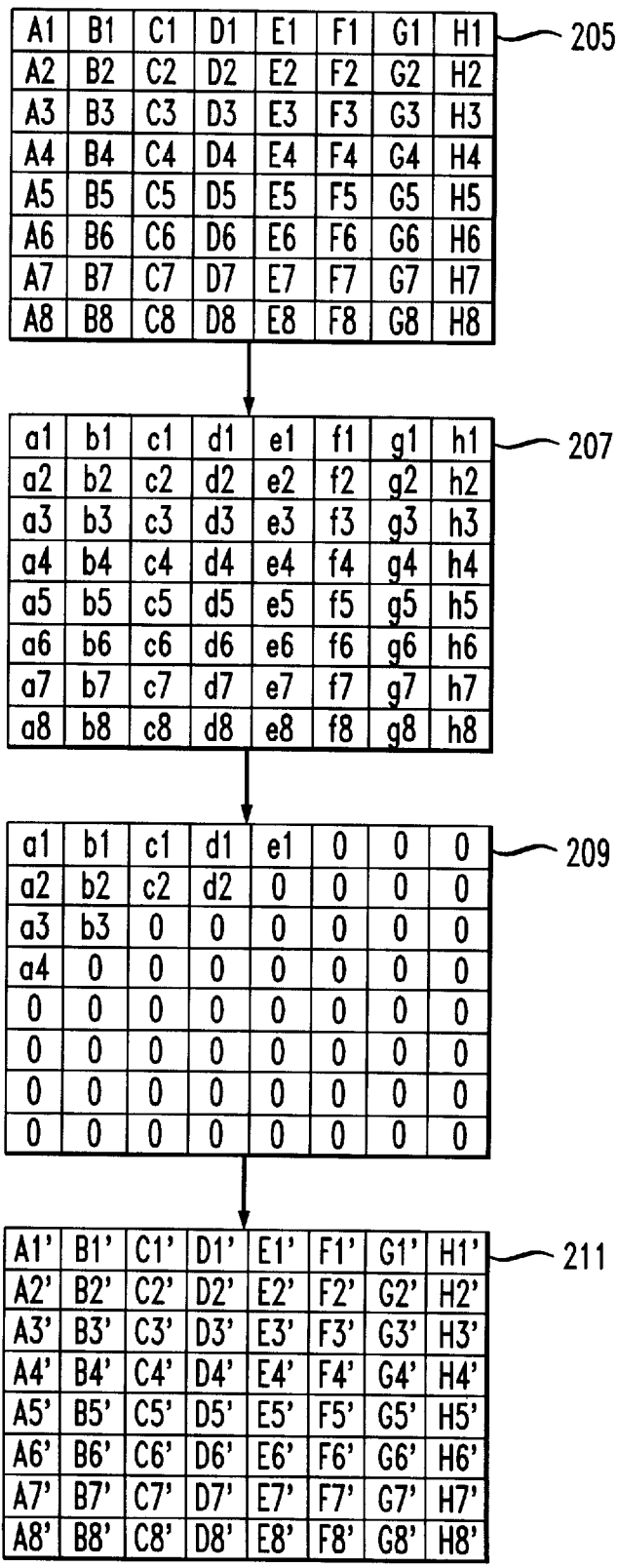
FIG. 2 illustrates a postprocess performed by a coding-matched filter arrangement in accordance with the invention to improve the quality of a recovered image in the system of FIG. 1.

In performing the 8×8 DCT, processor 183 first divides the recovered image frame into blocks of 8 pixels by 8 pixels. Each block is associated with one or more pixels in the frame. FIG. 2 illustrates one such block denoted 205 which includes pixels A1, B1, . . . , and H8, and is associated with pixel D4 only. Processor 183 then transforms each block in accordance with the DCT. For example, the transformed version of block 205 is illustratively block 207, which includes DCT coefficients a1, b1, . . . , and h8 corresponding thereto.

We have recognized that because of the implementation of the aforementioned coding scheme involving the quantized DCT transformation in encoder 103, the smallest value of a nonzero DCT coefficient in block 207 cannot be smaller than the corresponding quantization threshold $Q_{ij}/2$. Any non-zero DCT coefficient in block 207 having an absolute value smaller than the corresponding $Q_{ij}/2$ must be erroneously created, perhaps, by aliasing which is incurred due to the block structure of the DCT coefficients from DCT processor 119 traversing the aforementioned communication channel, which is band limited.

Thus, in accordance with the invention, in response to the aforementioned information concerning $Q_{ij}$ from video decoder 150, threshold controller 185 truncates all DCT coefficients whose absolute values are below the corresponding $Q_{ij}/2$ to zero, without losing any transmitted information. Assuming that all DCT coefficients in block 207, except a few coefficients, namely, a1, b1, c1, d1, e1, a2, b2, c2, d2, a3, b3 and a4, each have an absolute value smaller than the corresponding $Q_{ij}/2$, controller 185 accordingly replaces all the DCT coefficients except those few coefficients with a zero, thereby yielding block 209. IDCT processor 187 then performs an inverse DCT on block 209, resulting in block 211 consisting of pixels A1', B1', and H8'. However, the output of processor 187 in this instance consists of pixel D4' in block 211 corresponding to pixel D4 associated with block 205. This output replaces pixel D4 in the recovered frame from decoder 150. The process of FIG. 2 is similarly repeated for each other block as divided by processor 183 for replacement of the pixel associated therewith. The resulting frame containing the replacement pixels is advantageously superior in quality to the recovered frame, with the effects of the aforementioned coding artifacts substantially reduced.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

Figure 3:
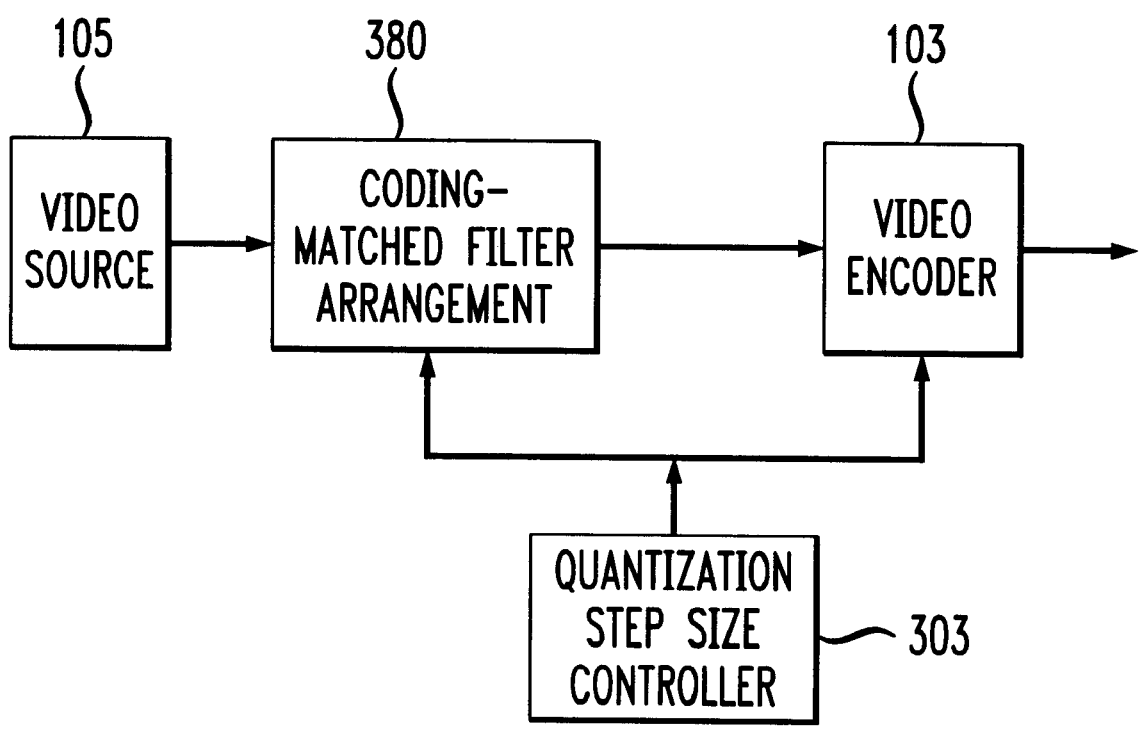
FIG. 3 illustrates a video encoder using the coding-matched filter arrangement as a preprocessor in accordance with the invention.

For example, in the disclosed embodiment, coding-matched filter arrangement 180 in accordance with the invention is used as a postprocessor in communication system 100. However, it will be appreciated that the inventive arrangement may be used as a preprocessor in the system as well. FIG. 3 illustrates one such system wherein coding-matched filter arrangement 380 similar to arrangement 180 processes the bit stream representative of image frames from video source 105 before video encoder 103. In that system, the threshold controller in arrangement 380 effectively removes all frequency components of each image frame whose amplitude is lower than the corresponding threshold $Q_{ij}/2$. It should be noted that the majority of the frequency components in the image frame having such a low amplitude typically are those of high frequencies. The removal of the high frequency information which often represents, e.g., sharp object boundaries, does not significantly affect the image frame visually as human eyes naturally possess particular visual sensitivity toward edges and boundaries in an image anyway. Transmission of the image frames preprocessed by arrangement 380 advantageously requires less bandwidth than their unprocessed counterparts, thereby allowing a finer quantization used in encoder 103 to further reduce the effects of the coding artifacts. Quantization step size controller 303 determines the value $Q_{ij}$ for the threshold controller in arrangement 380 and the quantizer in encoder 103 according to the bit rate allowed by the available transmission bandwidth, where $Q_{ij}$ varies inversely with such a bit rate.

In addition, although the inventive coding-matched filter arrangement is used with an MPEG coding scheme in the disclosed embodiment, the arrangement may also be matched to, and used with, other image coding schemes such as the MPEG-2 scheme, motion-JPEG scheme, JPEG scheme, etc.

Finally, communications system 100 is disclosed herein in a form in which various transmitter functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for processing an image that has been encoded by a coding process, which includes quantization of information concerning the image in accordance with one or more quantization step sizes, the apparatus comprising:
    a processor for transforming the image into a set of components representative thereof, one of the one or more quantization step sizes being associated with a respective one of the components; and
    a controller operatively coupled to the processor, the controller receiving quantization information matched to the coding process and removing one or more selected components from the set of components, each selected component having an absolute value below a threshold value corresponding thereto, the threshold value being a function of the quantization information associated with the selected component.

2. The apparatus of claim 1 wherein the image is encoded in accordance with an MPEG scheme.

3. The apparatus of claim 1 wherein the image is transformed in accordance with a block based frequency transform.

4. The apparatus of claim 3 wherein the block based frequency transform includes a discrete cosine transform (DCT).

5. The apparatus of claim 1 wherein the at least one quantization step size varies with time.

6. The apparatus of claim 1 wherein the threshold value equals a half of the associated quantization step size.

7. The apparatus of claim 1 wherein the processor includes the controller.

8. Apparatus for processing at least one image for transmission, the image being represented by a selected set of frequency components, the apparatus comprising:
    a processor for modifying the image, the modified image being represented by a second set of frequency components, each frequency component in the second set being included in the selected set; and
    a quantizer operatively coupled to the processor, the quantizer receiving quantization information matched to a subsequent coding process for encoding the image, and quantizing selected information concerning the modified image in accordance with one or more quantization step sizes, one of the one or more quantization step sizes being associated with a respective one of the frequency components in the second set, each non-zero frequency component in the second set having an absolute value equal to at least a threshold value corresponding thereto, the threshold value being a function of the quantization information associated with the non-zero frequency component.

9. The apparatus of claim 8 wherein the selected information includes prediction error information indicating a difference between the modified image and a predicted version thereof.

10. The apparatus of claim 9 wherein the prediction error information includes DCT coefficients representative thereof.

11. The apparatus of claim 8 wherein the quantizer is a linear quantizer.

12. The apparatus of claim 8 wherein the at least one quantization step size varies with time.

13. The apparatus of claim 8 wherein the threshold value equals a half of the associated quantization step size.

14. Apparatus for receiving information concerning at least one image that has been encoded by a coding process, the apparatus comprising:

a receiver for recovering the image, the receiver including an inverse quantizer for de-quantizing at least part of the received information in accordance with one or more quantization step sizes; and a controller operatively coupled to the receiver, the controller receiving quantization information matched to the coding process and modifying the recovered image by removing therefrom selected frequency components of the recovered image, each selected frequency component being associated with a respective one of the one or more quantization step sizes, each selected frequency component having an absolute value below a threshold value corresponding thereto, the threshold value being a function of the quantization information associated with the selected frequency component.

15. The apparatus of claim 14 wherein the at least part of the received information includes prediction error information indicating a difference between the image and a predicted version thereof.

16. The apparatus of claim 14 wherein the selected frequency components are represented by DCT coefficients.

17. The apparatus of claim 14 wherein the recovered image includes a plurality of pixels, the controller including a processor for dividing the recovered image into a plurality of blocks, each block containing a predetermined number of pixels.

18. The apparatus of claim 17 wherein each block is associated with one or more of the pixels in the block.

19. The apparatus of claim 18 wherein the processor processes each block to generate one or more pixels to replace the one or more of the pixels associated with the block, respectively.

20. The apparatus of claim 19 wherein the one or more pixels generated constitute the modified recovered image.

21. A method for processing an image that has been encoded by a coding process, which includes quantization of information concerning the image in accordance with one or more quantization step sizes, the method comprising the steps of:

transforming the image into a set of components representative thereof, one of the one or more quantization step sizes being associated with a respective one of the components;

receiving quantization information matched to the coding process, the quantization information including the quantization step size associated with each of the components; and removing one or more selected components from the set of components, each selected component having an absolute value below a threshold value corresponding thereto, the threshold value being a function of the quantization information associated with the selected component.

22. The method of claim 21 wherein the image is encoded in accordance with an MPEG scheme.

23. The method of claim 21 wherein the image is transformed in accordance with a block based frequency transform.

24. The method of claim 23 wherein the block based frequency transform includes a DCT.

25. The method of claim 21 wherein the at least one quantization step size varies with time.

26. The method of claim 21 wherein the threshold value equals a half of the associated quantization step size.

27. A method for processing at least one image for transmission, the image being represented by a selected set of frequency components, the method comprising the steps of:

modifying the image, the modified image being represented by a second set of frequency components, each frequency component in the second set being included in the selected set;

receiving quantization information matched to a subsequent coding process for encoding the image, the quantization information including a quantization step size associated with each of the frequency components; and quantizing selected information concerning the modified image in accordance with one or more quantization step sizes, one of the one or more quantization step sizes being associated with a respective one of the frequency components in the second set, each non-zero frequency component in the second set having an absolute value equal to at least a threshold value corresponding thereto, the threshold value being a function of the quantization information associated with the non-zero frequency component.

28. The method of claim 27 wherein the selected information includes prediction error information indicating a difference between the modified image and a predicted version thereof.

29. The method of claim 28 wherein the prediction error information includes DCT coefficients representative thereof.

30. The method of claim 27 wherein the at least one quantization step size varies with time.

31. The method of claim 27 wherein the threshold value equals a half of the associated quantization step size.

32. A method for receiving information concerning at least one image that has been encoded by a coding process, the method comprising the steps of:

recovering the image;

de-quantizing at least part of the received information in accordance with one or more quantization step sizes;

receiving quantization information matched to the coding process, the quantization information including a quantization step size associated with each of the components; and modifying the recovered image by removing therefrom one or more selected frequency components of the recovered image, each selected frequency component being associated with a respective one of the one or more quantization step sizes, each selected frequency component having an absolute value below a threshold value corresponding thereto, the threshold value being a function of the quantization information associated with the selected frequency component.

33. The method of claim 32 wherein the at least part of the received information includes prediction error information indicating a difference between the image and a predicted version thereof.

34. The method of claim 32 wherein the selected frequency components are represented by DCT coefficients.

35. The method of claim 32 wherein the recovered image includes a plurality of pixels, the method further comprising dividing the recovered image into a plurality of blocks, each block containing a predetermined number of pixels.

36. The method of claim 35 wherein each block is associated with one or more of the pixels in the block.

37. The method of claim 36 further comprising processing each block to generate one or more pixels to replace the one or more of the pixels associated with the block, respectively.

38. The method of claim 37 wherein the one or more pixels generated constitute the modified recovered image.

* * * * *

UNITED STATES PATENT AND TRADEMARK OFFICE
CERTIFICATE OF CORRECTION

PATENT NO.   : 6,459,731 B1
DATED        : October 1, 2002
INVENTOR(S)  : K.N. Matthews et al.

It is certified that error appears in the above-identified patent and that said Letters Patent is hereby corrected as shown below:

Title page,
Item [56], FOREIGN PATENT DOCUMENTS, after "EP 0 848 557 A2 6/1998", insert the following publication as follows -- CA 02275320 7/1998 --

Column 6,
Line 2, cancel beginning with "1. Apparatus for processing" to and including "the selected component."
Line 17, insert the following claim:

--1. Apparatus for filtering a decoded image that has been previously encoded by a coding process, which includes quantization of information concerning the image in accordance with one or more quantization step sizes, the apparatus comprising:
a processor for transforming the image into a set of components representative thereof, one of the one or more quantization step sizes being associated with a respective one of the components; and
a controller operatively coupled to the processor, the controller receiving quantization information matched to the coding process and removing one or more selected components from the set of components, each selected component having an absolute value below a threshold value corresponding thereto, the threshold value being adjusted as a function of the quantization information associated with the selected component;
the processor and the controller thereby operating in conjunction with one another to implement a filtering of the decoded image for improving an image quality thereof.--

Line 32, cancel beginning with "8. Apparatus for processing" to and including "frequency component."
Line 51, insert the following claim:

--8. Apparatus for processing at least one image for transmission, the image being represented by a selected set of frequency components, the apparatus comprising:
a processor for modifying the image prior to an encoding of the image, the modified image being represented by a second set of frequency components, each frequency component in the second set being included in the selected set; and
a quantizer operatively coupled to the processor, the quantizer receiving quantization information matched to a subsequent coding process for encoding the image, and quantizing selected information concerning the modified image in accordance with one or more quantization step sizes, one of the one or more quantization step sizes being associated with a respective one of the frequency components in the second set, each non-zero frequency component in the second set having an absolute value equal to at least a threshold value corresponding thereto, the threshold value being adjusted as a function of the quantization information associated with the non-zero frequency component;
the processor and the quantizer thereby operating in conjunction with one another to implement a filtering of the image in generating the modified image.--

UNITED STATES PATENT AND TRADEMARK OFFICE
CERTIFICATE OF CORRECTION

PATENT NO. : 6,459,731 B1
DATED : October 1, 2002
INVENTOR(S) : K.N. Matthews et al.

It is certified that error appears in the above-identified patent and that said Letters Patent is hereby corrected as shown below:

Column 6 (cont'd),
Line 65, cancel beginning with "14. Apparatus for receiving" to and including "frequency component."

Column 7,
Line 15, insert the following claim:

--14. Apparatus for receiving information concerning at least one image that has been encoded by a coding process, the apparatus comprising:
 a receiver for recovering the image, the receiver including an inverse quantizer for de-quantizing at least part of the received information in accordance with one or more quantization step sizes; and
 a controller operatively coupled to the receiver, the controller receiving quantization information matched to the coding process and filtering the recovered image by removing therefrom selected frequency components of the recovered image, each selected frequency component being associated with a respective one of the one or more quantization step sizes, each selected frequency component having an absolute value below a threshold value corresponding thereto, the threshold value being adjusted as a function of the quantization information associated with the selected frequency component.--

Line 35, cancel beginning with "21. A method for processing" to and including "selected component."
Line 52, insert the following claim:

--21. A method for filtering a decoded image that has been previously encoded by a coding process, which includes quantization of information concerning the image in accordance with one or more quantization step sizes, the method comprising the steps of:
 transforming the image into a set of components representative thereof, one of the one or more quantization step sizes being associated with a respective one of the components;
 receiving quantization information matched to the coding process, the quantization information including the quantization step size associated with each of the components; and
 removing one or more selected components from the set of components, each selected component having an absolute value below a threshold value corresponding thereto, the threshold value being adjusted as a function of the quantization information associated with the selected component, whereby a filtered decoded image having an improved an image quality is formed.--

UNITED STATES PATENT AND TRADEMARK OFFICE
CERTIFICATE OF CORRECTION

PATENT NO. : 6,459,731 B1
DATED : October 1, 2002
INVENTOR(S) : K.N. Matthews et al.

It is certified that error appears in the above-identified patent and that said Letters Patent is hereby corrected as shown below:

Column 7 (cont'd),
Line 64, cancel beginning with "27. A method for processing" to and including "frequency component."

Column 8,
Line 19, insert the following claim:

-- 27. A method for processing at least one image for transmission, the image being represented by a selected set of frequency components, the method comprising the steps of:
modifying the image prior to an encoding of the image, the modified image being represented by a second set of frequency components, each frequency component in the second set being included in the selected set;
receiving quantization information matched to a subsequent coding process for encoding the image, the quantization information including a quantization step size associated with each of the frequency components; and
quantizing selected information concerning the modified image in accordance with one or more quantization step sizes, one of the one or more quantization step sizes being associated with a respective one of the frequency components in the second set, each non-zero frequency component in the second set having an absolute value equal to at least a threshold value corresponding thereto, the threshold value being adjusted as a function of the quantization information associated with the non-zero frequency component. --

UNITED STATES PATENT AND TRADEMARK OFFICE
CERTIFICATE OF CORRECTION

PATENT NO. : 6,459,731 B1
DATED : October 1, 2002
INVENTOR(S) : K.N. Matthews et al.

It is certified that error appears in the above-identified patent and that said Letters Patent is hereby corrected as shown below:

Column 8 (cont'd),
Line 30, cancel beginning with "32. A method for receiving" to and including "frequency component."
Line 48, insert the following claim:

--32. A method for receiving information concerning at least one image that has been encoded by a coding process, the image being represented by a set of components, the method comprising the steps of:
  recovering the image;
  de-quantizing at least part of the received information in accordance with one or more quantization step sizes;
  receiving quantization information matched to the coding process, the quantization information including a quantization step size associated with each of the components; and
  filtering the recovered image by removing therefrom one or more selected frequency components of the recovered image, each selected frequency component being associated with a respective one of the one or more quantization step sizes, each selected frequency component having an absolute value below a threshold value corresponding thereto, the threshold value being adjusted as a function of the quantization information associated with the selected frequency component.--

Signed and Sealed this

Twentieth Day of May, 2003

JAMES E. ROGAN
*Director of the United States Patent and Trademark Office*